(12) United States Patent
Leverger et al.

(10) Patent No.: US 8,381,943 B2
(45) Date of Patent: Feb. 26, 2013

(54) OBTURATOR

(75) Inventors: Eric Leverger, Epone (FR); Laurent Huet, Meru (FR)

(73) Assignee: I.T.W. de France, Beuchamp (FR)

( * ) Notice: Subject to any disclaimer, the term of this patent is extended or adjusted under 35 U.S.C. 154(b) by 241 days.

(21) Appl. No.: 12/922,471

(22) PCT Filed: Apr. 16, 2009

(86) PCT No.: PCT/IB2009/051595
§ 371 (c)(1),
(2), (4) Date: Sep. 14, 2010

(87) PCT Pub. No.: WO2009/133487
PCT Pub. Date: Nov. 5, 2009

(65) Prior Publication Data
US 2011/0005141 A1    Jan. 13, 2011

(30) Foreign Application Priority Data
Apr. 30, 2008  (FR) ...................................... 08 52958

(51) Int. Cl.
*B65D 39/00* (2006.01)
*B65D 41/00* (2006.01)
(52) U.S. Cl. ..................... 220/787; 220/789; 220/359.4; 220/359.1
(58) Field of Classification Search ............... 220/359.1, 220/359.4, 784, 787, 789
See application file for complete search history.

(56) References Cited

U.S. PATENT DOCUMENTS

| 4,761,319 | A | * | 8/1988 | Kraus et al. ..................... 428/99 |
| 5,267,667 | A | | 12/1993 | Cozzani |
| 5,454,479 | A | * | 10/1995 | Kraus ........................... 220/787 |
| 5,513,769 | A | | 5/1996 | de Baets |
| 6,562,477 | B1 | | 5/2003 | Leon et al. |
| 2007/0108216 | A1 | * | 5/2007 | Kurth et al. .................. 220/789 |

FOREIGN PATENT DOCUMENTS

| FR | 2682072 A1 | 4/1993 |
| FR | 2707233 A1 | 1/1995 |
| FR | 2781496 A1 | 1/2000 |

OTHER PUBLICATIONS

ISR for PCT/IB2009/051595 mailed Jul. 22, 2009.
French Search Report for FR 0852958 dated Nov. 20, 2008.

* cited by examiner

*Primary Examiner* — Anthony Stashick
*Assistant Examiner* — James N Smalley
(74) *Attorney, Agent, or Firm* — Lowe Hauptman Ham & Berner, LLP

(57) ABSTRACT

An obturator for an opening of predetermined outline produced in a metal sheet comprising a cap, at least one stiff wall projecting transversely of said cap and at least one snap-fastening blade having a resting position in the absence of urging in which it extends in a direction parallel to said cap, said snap-fastening blade being moveable parallel to said cap against elastic return forces returning it towards said resting position, said snap-fastening blade having an insertion cant adapted to bear on the surface of said metal sheet delimiting said opening when the obturator is pushed therein, said insertion cant sloping relative to a direction transverse to said cap such that said snap-fastening blade is driven to displace to pass through said opening and that slope progressively increasing between said attachment end and said free end.

15 Claims, 5 Drawing Sheets

OBTURATOR

RELATED APPLICATIONS

The present application is national phase of International Application Number PCT/IB2009/051595 filed Apr. 16, 2009, and claims priority from, French Application Number 0852958 filed Apr. 30, 2008.

The invention relates to an obturator for an opening produced in a metal sheet, in particular in an automobile body metal sheet.

BACKGROUND

There is known already from French patent application 2 682 072 an obturator of this kind that includes a cap provided with a peripheral rim that comes to face the metal sheet at the border of the opening when the obturator is placed in it. A wall whose external surface has a shape corresponding to that of the opening is connected transversely to the peripheral rim. A number of lugs project from this wall, extending it. At the end of each lug a snap-fastening blade extends between an attachment end where it is connected to the lugs and a free end, parallel to the peripheral rim. Each snap-fastening blade has on the outside an insertion cant that is sloped as far as a step.

French patent application 2 707 233 also describes an obturator having the above features which further includes a fin disposed on the step of each snap-fastening blade and the exterior surface of which forms a gripping counter-cant.

The openings for which these obturators are provided are generally produced in the metal sheet by punching, and often have a rough peripheral border. It therefore often happens that the portions of this border in contact with the insertion cants dig into the blades instead of sliding over them and causing them to bend.

SUMMARY

The invention aims to improve the fitting of such an obturator into the opening.

To this end it proposes an obturator for an opening of predetermined outline produced in a metal sheet, comprising:
- a generally planar cap having a peripheral rim adapted to face said metal sheet around the border of the opening when the obturator is put in place therein;
- at least one stiff wall transversely projecting from said cap; and
- at least one snap-fastening blade having a resting position in the absence of urging in which it extends in a direction parallel to said cap, between an attachment end in which it is connected to said wall and a free end, said snap-fastening blade being moveable parallel to said cap against elastic return forces returning it towards said resting position, said snap-fastening blade having an insertion cant adapted to bear on the surface of said metal sheet delimiting said opening when the obturator is pushed therein, said insertion cant sloping relative to a direction transverse to said cap such that said snap-fastening blade is driven to displace to pass through said opening;

characterized in that the slope of said insertion cant relative to said transverse direction progressively increases between said attachment end and said free end.

The progressive increase in the slope of the insertion cant between the attachment end of the snap-fastening blade and its free end, by applying minimal force to the cap, produces the required displacement of the blade during the insertion phase.

Furthermore, this progressive increase reduces the risks of embedding of the border of the opening in the blade at the level of the cant, such variation enabling, compared to the cant of the prior art obturator where the slope is marked and constant, limiting the area of steep slope in proximity to the free end of the blade and enlarging the area in which the cant bears on the surface delimiting the opening.

According to features preferred for the performance that they achieve, said slope varies in predetermined manner in relation to said predetermined outline in order for each region in which said insertion cant is adapted to bear on said surface delimiting said opening when the obturator is pushed therein, to comprise a major part of the region of said cant which is then facing said surface delimiting said opening.

According to other features of the obturator preferred for reasons of simplicity and convenience as much in fabrication as in use:
- said snap-fastening blade is connected to said wall by a deformable elastic hinge formed on molding with said wall and said snap-fastening blade;
- said snap-fastening blade is stiffer than said hinge such that it is essentially said hinge which deforms to drive the pivoting of said snap-fastening blade about said hinge when the obturator is pushed into said opening;
- said hinge is bowed inwardly of said obturator;
- the major part of said insertion cant forms a section of a helicoid;
- said snap-fastening blade has a gripping counter-cant adapted to bear on said metal sheet when said blade is returned towards said resting position, said gripping counter-cant being oriented such that said cap is then driven towards said metal sheet;
- said gripping counter-cant extends over a distal portion of said snap-fastening blade and has two portions with different slope angles relative to said direction transverse to said cap;
- said predetermined outline being circular, said obturator is of circular general shape and comprises three said snap-fastening blades that are similar and that are evenly angularly distributed;
- said slope varies in predetermined manner relative to said predetermined circular outline in order for each region in which said insertion cant is adapted to bear on said surface delimiting said opening when the obturator is pushed therein, to form an arc of a circle;
- said obturator is adapted to a thickness of said metal sheet of between 0.5 and 5 mm;
- said predetermined outline being oblong, said obturator is of oblong general shape and comprises two said planar walls, disposed facing each other, two said snap-fastening blades being connected on respective opposite sides of each planar wall;
- said slope varies in predetermined manner relative to said predetermined oblong outline in order for each region in which said insertion cant is adapted to bear on said surface delimiting said opening when the obturator is pushed therein, to form a straight line;
- said obturator comprises an annular bead of hot melt adhesive deposited on said peripheral rim, provided to melt when said metal sheet is heated after putting said obturator in place in said opening, in order for the obturator, after cooling, to be bonded to said metal sheet by bonding of said peripheral rim onto said border of the opening; and said annular bead of hot melt adhesive is deposited on the face of said peripheral rim that is adapted to come to face said metal sheet.

BRIEF DESCRIPTION OF THE DRAWINGS

The disclosure of the invention will now be continued with the description of two embodiments, given hereinafter by way of nonlimiting illustration with reference to the appended drawings, in which.

DETAILED DESCRIPTION

Figure 1:
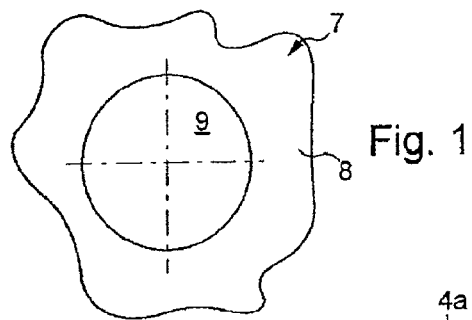
FIG. 1 is a top view of a metal sheet portion including a circular opening of predetermined diameter.

The metal sheet 8 illustrated in FIG. 1 includes a circular opening 9 that can been plugged by a obturator put in place by simply pushing it in. The obturator 1 illustrated in FIGS. 2 to 9 is adapted to plug such a predetermined opening 9 on offering it up facing the external face 7 of the metal sheet 8.

The obturator 1 which adopts the general circular shape of the opening 9 includes a body 2 molded in one piece onto the periphery of which is deposited an annular bead 3 of hot melt type adhesive.

The body 2 includes a cap 4 and three curved stiff walls 10 that project transversely from its inside face.

The cap 4 has a circular outline and extends in a plane except in its central zone 4a and its peripheral rim 5.

The central zone 4a forms a slight recess with a circular outline in order to facilitate the operations of molding the body 2.

Figure 9:
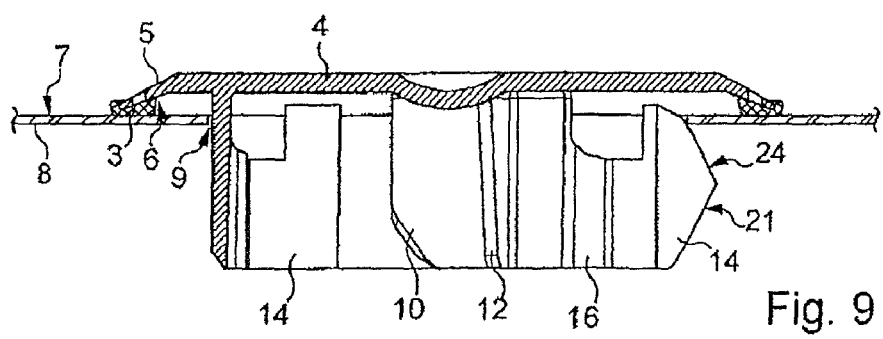
FIG. 9 is a view similar to FIG. 8 showing the obturator clipped into the opening in the metal sheet portion represented in FIG. 1.

The peripheral rim 5 extends outwards with a slight slope, its inside face 6 being adapted to face the outside face 7 of the metal sheet 8 at the border of the opening 9 that is produced therein when the obturator 1 is put in place in the opening 9 (FIGS. 1 and 9).

Figure 3:
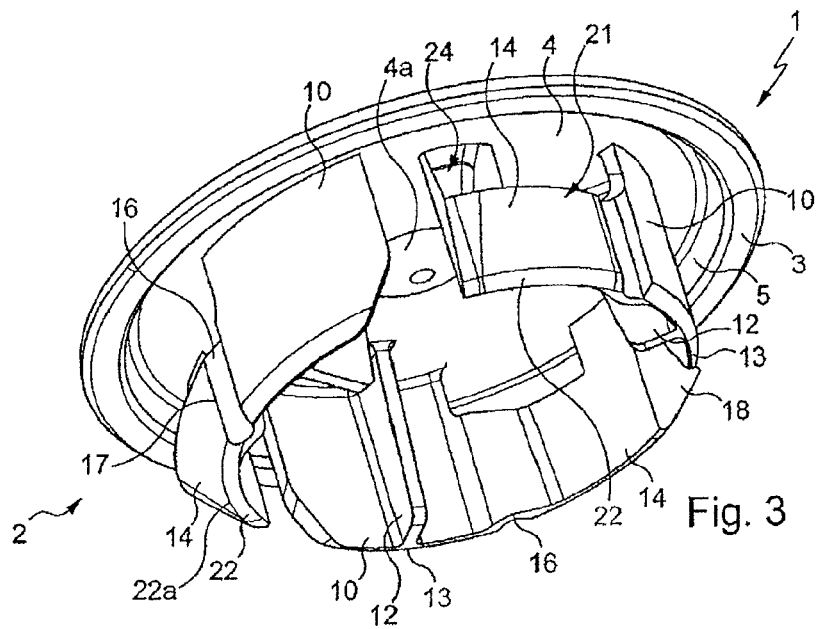
FIG. 3 is a perspective view of the obturator from FIG. 2 seen from another angle.
Figure 4:
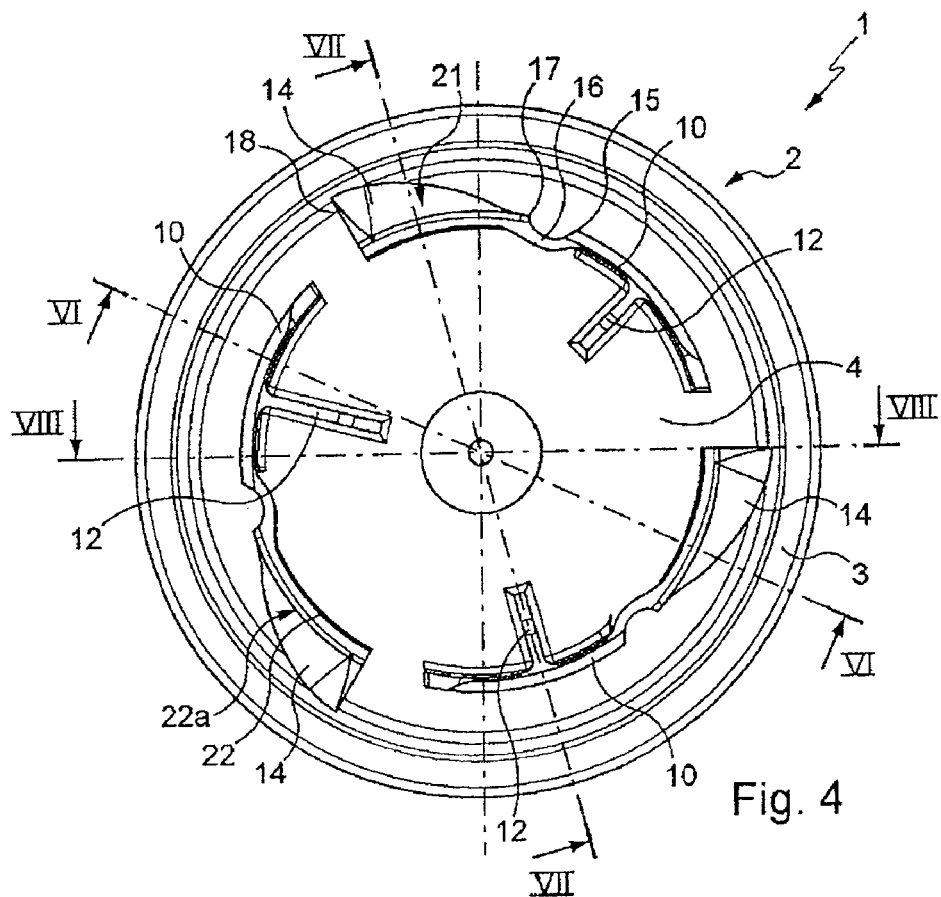
FIGS. 4 and 5 are respectively bottom and elevation views of the obturator from FIG. 2.

The bead 3 of hot melt adhesive is situated against the inside face 6 of this peripheral rim 5 whereas the three curved stiff walls 10 disposed in proximity to this same peripheral rim 5 (FIG. 3) are evenly angularly distributed (FIGS. 3 and 4).

The outside faces of the three curved walls 10 are centered on the axis 11 of the obturator 1 (FIG. 5), with a radius of curvature substantially equal to that of the opening 9 in order to facilitate fitting this same obturator 1.

On the inside of each curved wall 10, a reinforcing rib 12 (FIG. 3) extends transversely to this wall 10 from its beveled distal end 13 to the cap 4 of the obturator 1.

Figure 2:
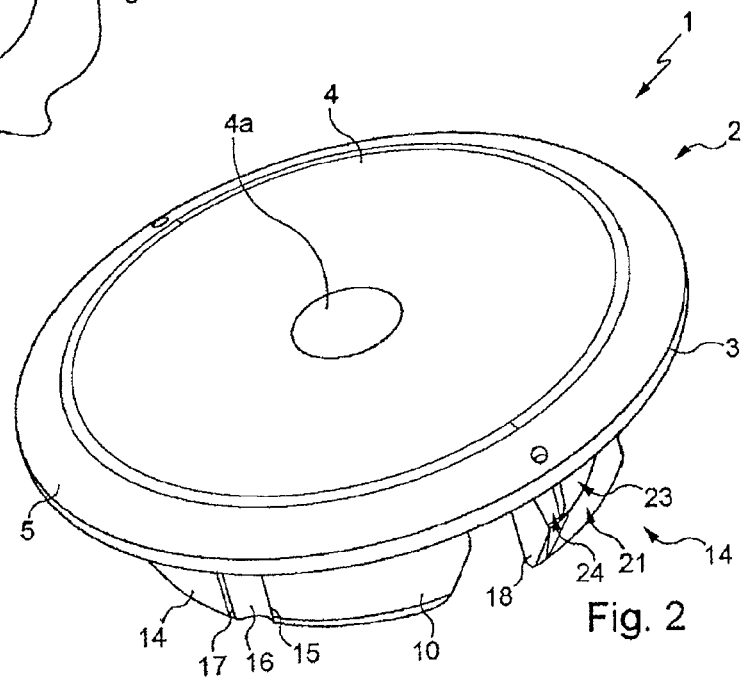
FIG. 2 is a perspective view, enlarged compared to FIG. 1, of a first embodiment of an obturator according to the invention, adapted to plug the opening represented in FIG. 1.

A snap-fastening blade 14 is connected to a lateral edge 15 of each curved wall 10 via an elastic deformable articulation hinge 16, the blade 14 and the hinge 16 being molded in one piece with the curved wall 10 (FIGS. 2 and 4).

The blades 14 are similar, evenly angularly distributed and in the absence of urging assume a resting position in which each extends in a direction parallel to the cap 4, between an attachment end 17 attached to the elastic hinge 16 and a free end 18 (FIGS. 2 and 4).

The elastic hinges 16, which have a double function of articulating the blades 14 to the curved walls 10 and of returning these same blades 14 into the resting position, are bowed inwardly of said obturator 1.

Figure 5:
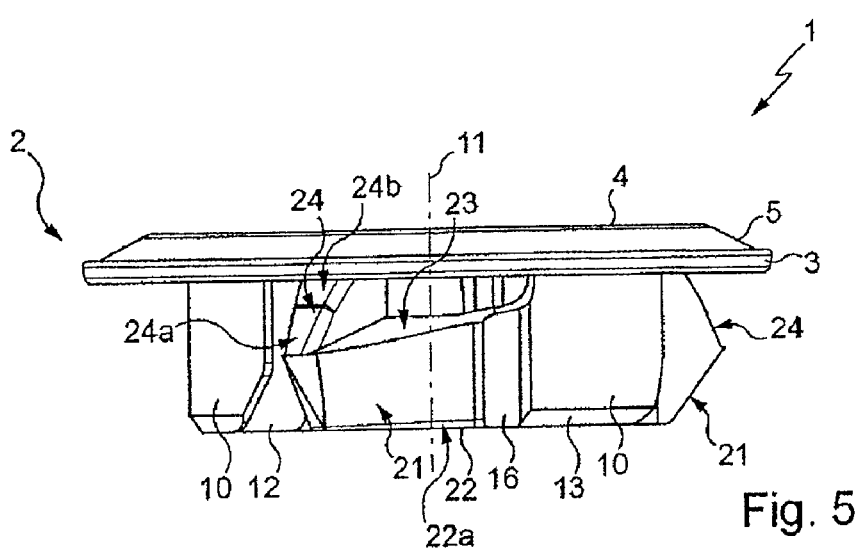

They extend from the distal end 13 over approximately two-thirds of the length of the lateral rim 15 of the curved wall 10 (FIG. 5). Alternatively, the length of the hinges 16 can vary as a function of the required return force.

The blades 14 will now be described in more detail.

Each of these blades 14 has on its outside face an insertion cant 21 that extends from the curved outside edge 22a of the beveled portion 22 of this blade 14 to a flat step 23 (FIG. 5).

In its beveled portion 22, and in the absence of urging, each blade 14 extends in line with the curved wall 10 so that the outside edge 22a is centered on the axis 11 and has the same radius of curvature as the outside faces of the three curved walls 10 (FIG. 4).

Figure 6:
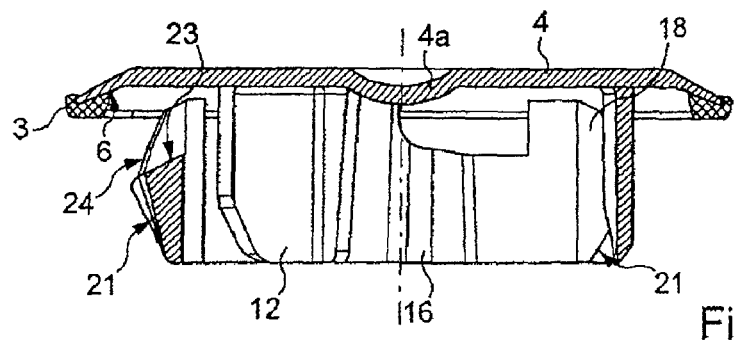
FIGS. 6, 7 and 8 are the views in section of the obturator from FIG. 2 respectively labeled VI-VI, VII-VII and VIII-VIII in FIG. 4, represented upside-down to facilitate comprehension.
Figure 7:
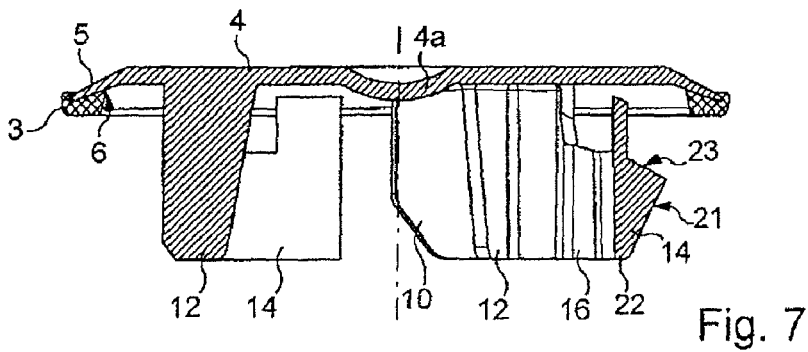
Figure 8:
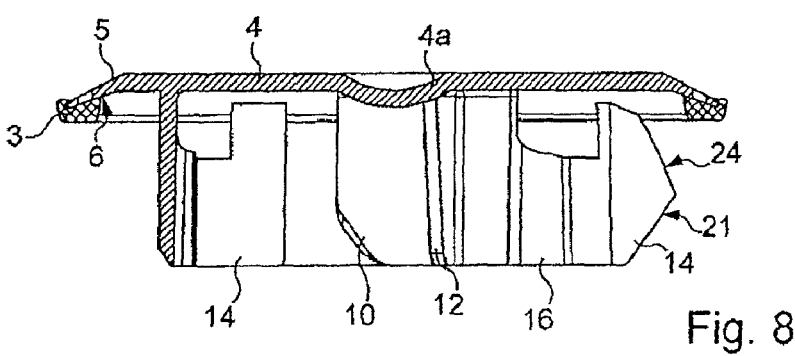

The insertion cant 21 slopes relative to the axial direction 11 of the obturator 1 (or to a transverse direction of the cap 4) and this slope increases progressively between its attachment end 17 and its free end 18 (the evolution of the angle of slope being clearly visible in FIGS. 6 to 8).

Thus at the attachment end 17 of the blade 14 (in proximity to the hinge 16), the insertion cant 21 is virtually parallel to the axial direction 11 of the obturator 1 whereas at the free end 18 of the blade 14 the insertion cant 21 forms an angle close to 45° with the same axial direction 11 of the obturator 1 (FIG. 8).

In the embodiment represented in FIGS. 2 to 9, the major part (more than three-quarters) of the insertion cant 21 forms a section of a helicoid.

All the sections of this helicoidal section in a plane parallel to the cap 4 form a circular arc line of intersection the radius of curvature of which remains constant and substantially equal to that of the circular opening 9.

Each blade 14 also has on its outside face a gripping counter-cant 24 that extends over a distal portion of this blade 14 and that is disposed above the step 23, the insertion cant 21 and the gripping cant 24 being connected to each other.

The gripping counter-cant 24 comprises two portions 24a and 24b, the first portion 24a, which is the farthest from the cap 4, forming a slightly less pronounced angle with the axis 11 than the second portion 24b.

To put the obturator 1 in place in the opening 9 produced in the metal sheet 8, it is offered up with the snap-fastening blades 14 to the front, the insertion cants 21 bearing on the surface of the metal sheet 8 delimiting the opening 9 when the obturator 1 is pushed into it.

Because the blades 14 are stiffer than the hinges 16, it is essentially the latter that deform during the pushing phase (as a result of the action of the loads exerted by the metal sheet 8), to drive the pivoting of the blades 14 on themselves.

The presence of these hinges 16 enables the blades 14 to suffer virtually no deformation that could compromise the quality of the contact with the surface of the metal sheet 8.

Each zone in which the insertion cant 21 bears on the metal sheet 8 is an arc of a circle and includes a major part of the zone of the cant 21 then facing the surface delimiting the opening 9.

This configuration of the insertion cants 21 enables very progressive pivoting of the snap-fastening blades 14 parallel to the cap 4.

Thus the obturator 1 necessitates only a minimal force (here of the order of 2 N) to put it in place, and avoids the rim of the opening 9 becoming embedded in the snap-fastening blades 14.

As soon as the insertion cants 21 have passed the inside rim (opposite the face 7) of the opening 9, the blades 14 are returned to their resting positions by the elastic hinges 16, so that it is now the counter-cants 24 that bear on the metal sheet 8, the orientation of the counter-cants 24 being such that the return of the blades 14 draws the cap 4 towards the metal sheet 8 and causes the obturator 1 to be pushed more deeply into the opening 9.

The double-slope configuration of the gripping counter-cants 24 is specifically designed so that the obturator 1 can be used with a wide range of metal sheet thicknesses (between 0.5 and 5 mm).

With metal sheets whose thickness is less than 2.5 mm, it is the second portion 24b that bears on the surface delimiting the opening 9.

With metal sheets of thickness between 2.5 mm and 5 mm, it is the first portion 24a forming a smaller slightly smaller angle with the axis 11 that bears on the surface delimiting the opening 9.

The inside face 6 of the peripheral rim 5 thus approaches the metal sheet 8 until the annular bead 3 of hot melt adhesive comes into contact with the metal sheet 8 (FIG. 9).

When the metal sheet 8 is heated, after snap-fastening the obturator 1 to it as described hereinabove and illustrated in FIG. 9, the bead 3 of adhesive melts and bonds the peripheral rim 5 to the outside face 7 of the metal sheet 8 at the border of the opening 9, which provides an excellent seal.

In variants that are not represented of this embodiment, the number of snap-fastening blades 14 is different from three, for example two or four, the blades preferably being evenly angularly distributed.

In another variant that is not represented, the obturator 1 does not include an annular bead of hot melt type adhesive.

Figure 10:
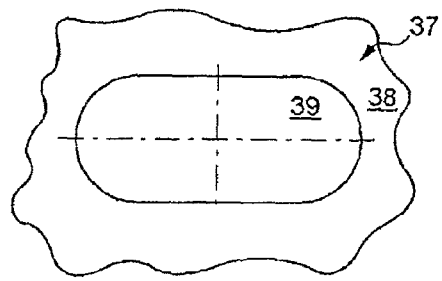
FIG. 10 is a top view of a metal sheet portion including an oblong opening of predetermined outline.

The metal sheet 38 illustrated in FIG. 10 has an oblong opening 39 which can be plugged by an obturator put in place by simply pushing it in. The obturator 31 illustrated in FIGS. 11 to 16 is adapted to plug this kind of predetermined opening 39 on offering it up to the outside face 37 of the metal sheet 38.

The obturator 31, which adopts the general oblong shape of the opening 39, is produced of a body 32 that is molded in one piece that includes a cap 34, two curved stiff walls 40 and two plane stiff walls 40a that project transversely from its inside face.

The cap 34 has an oblong outline and extends in a plane except in its central zone 34a and its peripheral rim 35.

The central zone 34a forms a slight recess with a circular outline in order to facilitate the operations of molding the body 32.

Figure 11:
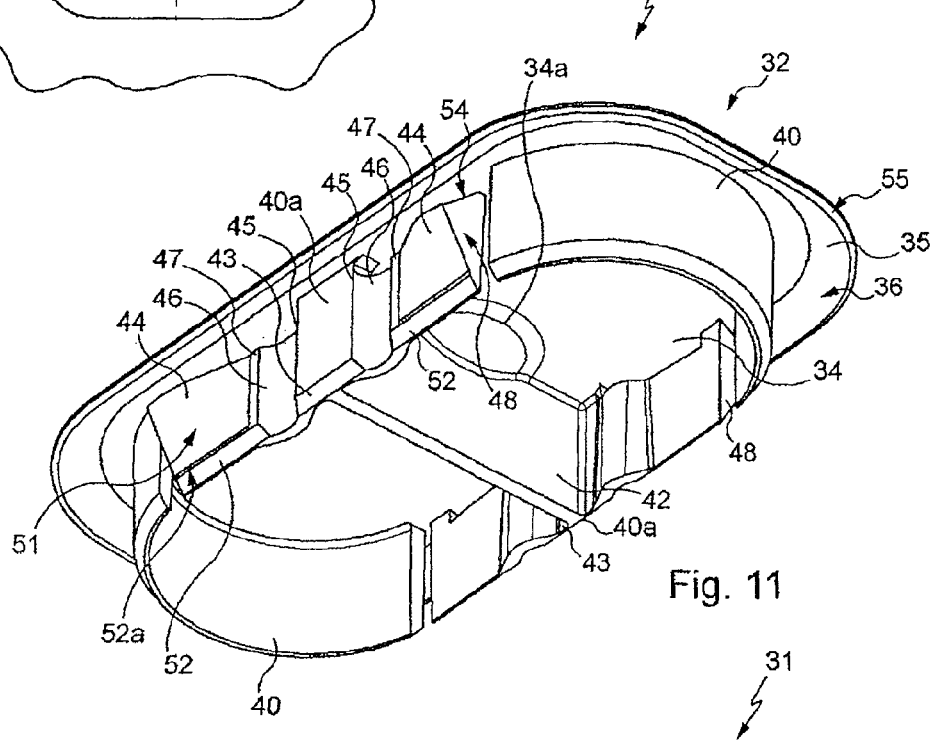
FIG. 11 is a perspective view, enlarged compared to FIG. 10, of a second embodiment of an obturator according to the invention, adapted to plug the opening represented in FIG. 10.

The peripheral rim 35 extends outwards and is slightly sloped, its inside face 36 being adapted to face the outside face 37 of the metal sheet 38 at the border of the opening 39 that is produced therein when the obturator 31 is put in place therein (FIGS. 10 and 11).

Figure 12:
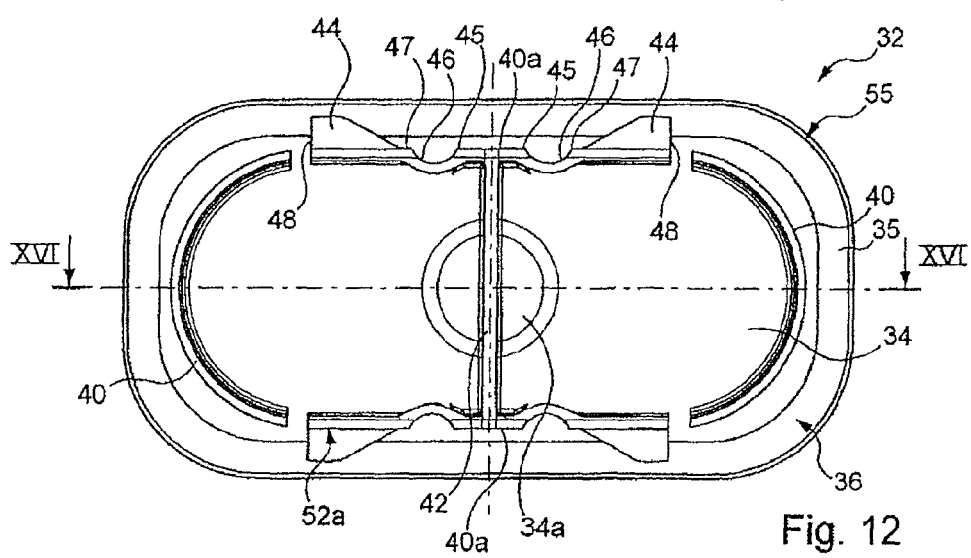
FIGS. 12 and 13 are respectively bottom and elevation views of the obturator from FIG. 11.

The two curved stiff walls 40 of semicircular section face each other and are disposed at the two ends of the cap 34 in proximity to the peripheral rim 35 (FIG. 12).

The two plane stiff walls 40a are situated halfway between the two curved walls 40 and are also disposed in proximity to the peripheral rim 35 (FIG. 12).

The outside faces of the two curved walls 40 and the two plane walls 40a have the same oblong outline (FIG. 12) as the opening 39, centered on the axis 41 of the obturator 31 (FIGS. 13 to 16).

A stiffening rib 42 extends transversely between the two plane walls 40a from their beveled distal ends 43 to the cap 34 of the obturator 31 (FIGS. 11 and 12).

Two snap-fastening blades 44 are each connected to a respective lateral rim 45 of each plane wall 40a by an elastic deformable articulation hinge 46, the blades 44 and the hinges 46 being formed on molding with the plane wall 40a (FIGS. 11 and 12).

The blades 44 are similar and in the absence of urging assume a resting position in which each extends in a longitudinal direction parallel to the cap 34, between an attachment end 47 attached to the elastic hinge 46 and a free end 48.

The elastic hinges 46, which have a double function of articulating the blades 44 to the plane walls 40a and of returning those same blades 44 to the resting position, are bowed inwardly of the obturator 31.

They extend from the beveled end 43 over about three-quarters of the length of the lateral rim 45 of the plane wall 40a. Alternatively, the length of the hinges 46 can vary as a function of the return force required.

The blades 44 will now be described in more detail.

Figure 13:
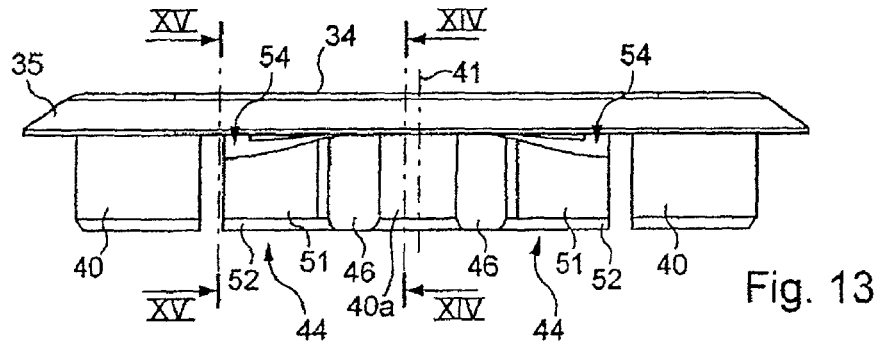
Figure 14:
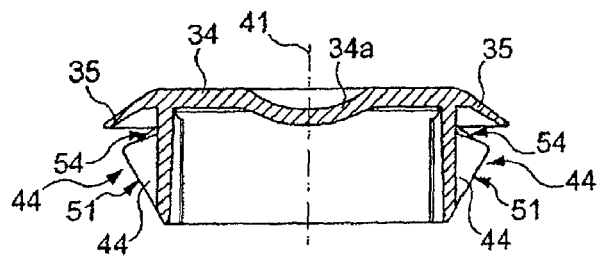
FIGS. 14 and 15 are the views in section of the obturator from FIG. 11 respectively labeled XIV-XIV and XV-XV in FIG. 13.

Each of these blades 44 has on its outside face an insertion cant 51 that extends from the straight external edge 52a of the beveled portion 52 of this blade 44 as far as a step forming a gripping counter-cant 54 (FIGS. 11 and 13).

In its beveled portion 52 and in the absence of urging, each lug 44 extends in line with the plane wall 40a with the result that the outside edge 52a has the same oblong outline with axis 41 as the outside faces of the two curved walls 40 and the two plane walls 40a (FIG. 12).

The insertion cant 51 is sloped relative to the axial direction 41 of the obturator 31 (or to a transverse direction of the cap 34) and this slope increases progressively between its attachment end 47 and its free end 48 (FIG. 11).

Figure 15:
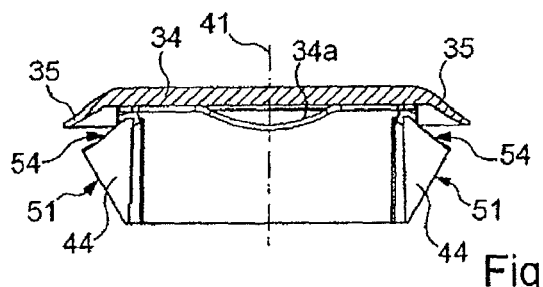
Figure 16:
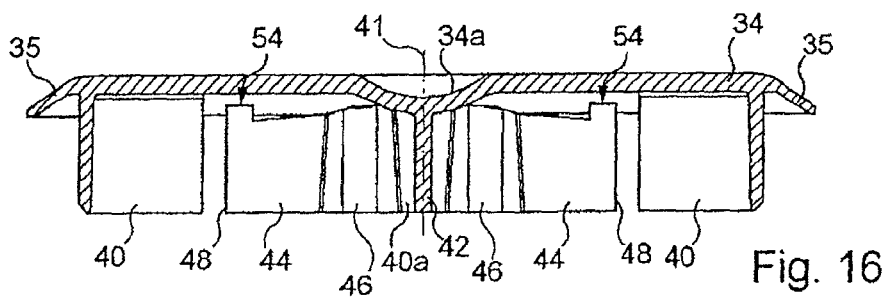
FIG. 16 is the view in section of the obturator from FIG. 11 labeled XVI-XVI in FIG. 12, represented upside-down to facilitate comprehension.

Thus at the attachment end 47 of the blade 44 (in proximity to the hinge 46), the insertion cant 51 is virtually parallel to the axial direction 41 of the obturator 31 whereas at the free end 48 of the blade 44 the insertion cant 51 forms an angle close to 30° with the same axial direction 41 of the obturator 31 (FIG. 15).

In the embodiment represented in FIGS. 11 to 16, the major part (more than three-quarters) of the insertion cant 51 forms a section of a helicoid.

All sections of this helicoidal section in a plane parallel to the cap 34 form a straight line segment line of intersection.

The obturator 31 is put in place in the opening 39 produced in the metal sheet 38 in a similar manner to the obturator 1, the insertion cants 51 bearing on the surface of the metal sheet 38 delimiting the opening 39 when the obturator 31 is pushed into it.

Because the blades 44 are stiffer than the hinges 46, it is essentially the latter that deform during the pushing phase (by the effect of the loads exerted by the metal sheet 38), to drive pivoting of the blades 44 on themselves.

The presence of these hinges 46 enables the blades 44 to suffer virtually no deformation that could compromise the quality of the contact with the surface of the metal sheet 38.

Each zone in which the insertion cant 51 bears on the metal sheet 38 is a straight line segment and includes a major portion of the zone of the cant 51 then facing the surface delimiting the opening 39.

This configuration of the insertion cants 51 enables very progressive pivoting of the snap-fastening blades 44 parallel to the cap 34.

As soon as the insertion cants 51 have passed the lower rim of the opening 39, the blades 44 are returned to their resting positions by the elastic hinges 46, with the result that it is now the counter-cants 54 that bear on the metal sheet 38, the orientation of these counter-cants 54 being such that the return of the blades 44 draws the cap 34 toward the metal sheet 38 and causes the obturator 31 to be pushed further into the opening 39.

The inside face 36 of the peripheral rim 35 therefore approaches the metal sheet 38 until its free end 55 (FIG. 11) comes to face the metal sheet 38.

In a variant that is not represented, the obturator 31 includes at its periphery an annular bead of hot melt type adhesive.

It will also be noted that the obturator can adopt a shape other than oblong or circular, and more generally it is pointed out that the invention is not limited to the embodiments described.

The invention claimed is:

1. An obturator for an opening of a predetermined outline disposed in a metal sheet, comprising:
a generally planar cap having a peripheral rim adapted to face said metal sheet around a border of said opening when the obturator is disposed within said opening;
at least one stiff wall transversely projecting from an underside of said cap; and
at least one snap-fastening blade having a first free end and a second attachment end, and extending parallel to said underside of said cap, said at least one snap-fastening blade being in a resting position;
a deformable elastic hinge element connecting said second attachment end of said at least one snap-fastening blade with said at least one stiff wall, wherein said snap-fastening blade is moveable parallel to said cap against elastic bias force from said deformable elastic hinge element thereby returning said at least one snap-fastening blade element back to said resting position when said obturator is disposed within said opening,
said at least one snap-fastening blade having an insertion cant adapted to bear on the surface of said metal sheet delimiting said opening when the obturator is pushed within the opening, said insertion cant sloping relative to a direction transverse to said cap such that said snap-fastening blade is driven to displace to pass through said opening;
wherein the slope of said insertion cant relative to said transverse direction progressively increases between said attachment end and said free end.

2. An obturator according to claim 1, wherein said at least one snap-fastening blade is movable at only the deformable elastic hinge element regardless of the size of the opening of the metal sheet.

3. An obturator according to claim 1, wherein said slope varies in predetermined manner in relation to said predetermined outline in order for each region in which said insertion cant is adapted to bear on said surface delimiting said opening when the obturator is pushed therein, to comprise a portion of the region of said cant which is then facing said surface delimiting said opening.

4. An obturator according to claim 1, wherein said snap-fastening blade is stiffer than said hinge such that it is essentially said hinge which deforms to drive the pivoting of said snap-fastening blade about said hinge when the obturator is pushed into said opening.

5. An obturator according to claim 1, wherein said hinge is bowed inwardly of said cap.

6. An obturator according to claim 1, wherein the major part of said insertion cant forms a section of a helicoid.

7. An obturator according to claim 1, wherein said snap-fastening blade has a gripping counter-cant adapted to bear on said metal sheet when said blade is returned towards said resting position, said gripping counter-cant being oriented such that said cap is then driven towards said metal sheet.

8. An obturator according to claim 7, wherein said gripping counter-cant extends over a distal portion of said snap-fastening blade and has two portions with different slope angles relative to said direction transverse to said cap.

9. An obturator according to claim 1, wherein said predetermined outline being circular, said obturator is of circular general shape and comprises three said snap-fastening blades that are similar and that are evenly angularly distributed.

10. An obturator according to claim 9, wherein said slope varies in predetermined manner relative to said predetermined circular outline in order for each region in which said insertion cant is adapted to bear on said surface delimiting said opening when the obturator is pushed therein, to form an arc of a circle.

11. An obturator according to claim 9, wherein it is adapted to a thickness of said metal sheet of between 0.5 and 5 mm.

12. An obturator according to claim 1, wherein said predetermined outline being oblong, said obturator is of oblong general shape and comprises two said planar walls, disposed facing each other, two said snap-fastening blades being connected on respective opposite sides of each planar wall.

13. An obturator according to claim 12, wherein said slope varies in predetermined manner relative to said predetermined oblong outline in order for each region in which said insertion cant is adapted to bear on said surface delimiting said opening when the obturator is pushed therein, to form a straight line.

14. An obturator according to claim 1, wherein it comprises an annular bead of hot melt adhesive deposited on said peripheral rim, provided to melt when said metal sheet is heated after putting said obturator in place in said opening, in order for the obturator, after cooling, to be bonded to said metal sheet by bonding of said peripheral rim onto said border of the opening.

15. An obturator according to claim 14, wherein said annular bead of hot melt adhesive is deposited on the face of said peripheral rim that is adapted to come to face said metal sheet.

* * * * *